(No Model.) 2 Sheets—Sheet 1.
W. HAILES.
BROILER.
No. 284,295. Patented Sept. 4, 1883.
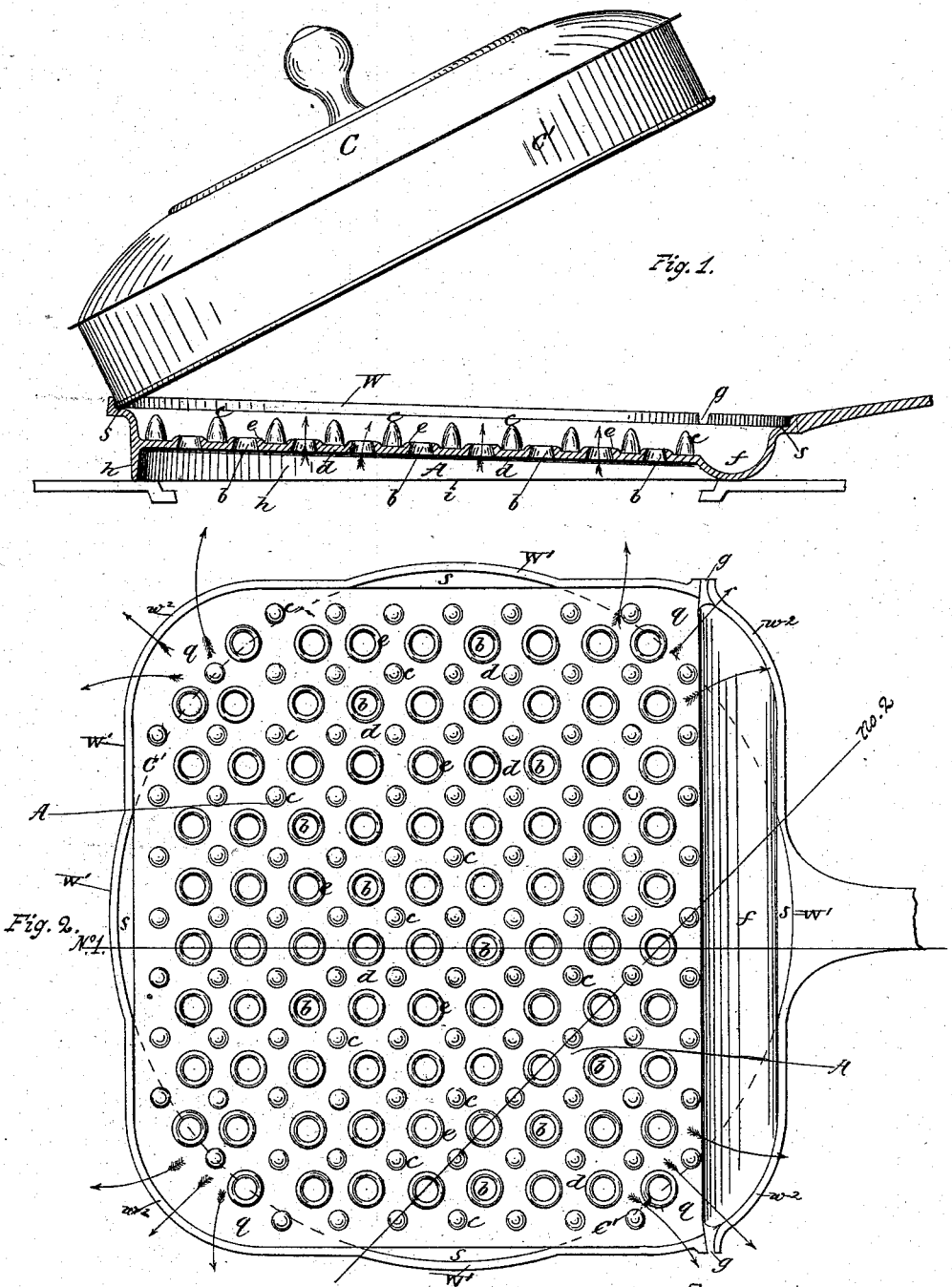
Witnesses:
John La Dow
Charles Leerink
William Hailes
Inventor (No Model.) 2 Sheets—Sheet 2.
W. HAILES.
BROILER.
No. 284,295. Patented Sept. 4, 1883.
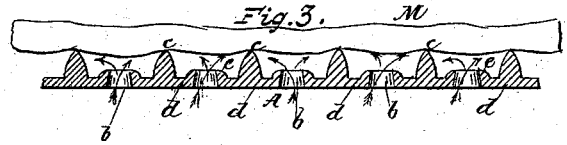
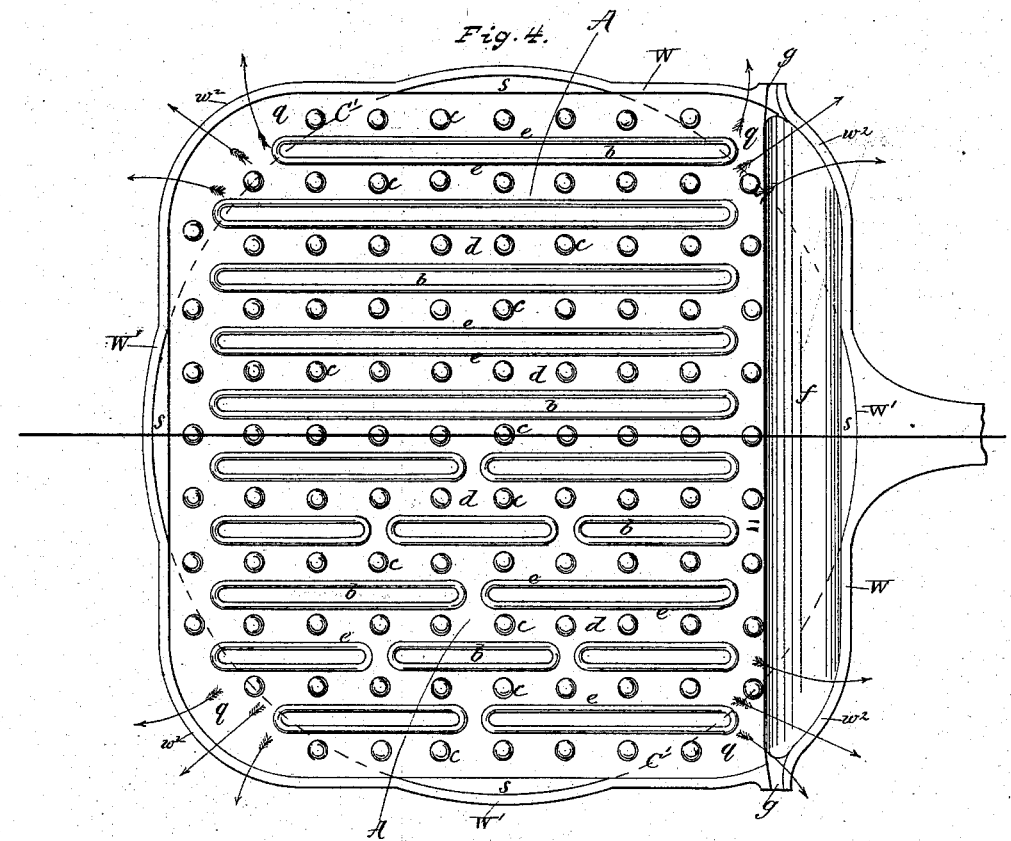
Witnesses.
John La Dow
Charles Leesink
William Hailes
Inventor.

UNITED STATES PATENT OFFICE.

WILLIAM HAILES, OF ALBANY, NEW YORK.

BROILER.

SPECIFICATION forming part of Letters Patent No. 284,295, dated September 4, 1883.

Application filed June 9, 1883. (No model.)

*To all whom it may concern:*

Be it known that I, WILLIAM HAILES, a citizen of the United States, and a resident of the city and county of Albany, in the State of New York, have invented a new and Improved Broiler, of which the following is a specification.

My invention relates to an improved broiler in which there is employed an inclined flat and intersecting channeled web, which is provided with a series of meat-supporting posts or projections, and having a reservoir located at the side toward which the perforated and channeled web inclines, and a horizontal depending skirt and upwardly-projecting side wall, provided with a series of cover-seats, and having portions thereof setting out past the line of said cover-seats.

The objects of my invention are to provide, in a broiler, a slightly-inclined perforated web or bottom, in which the perforations will be circular and the web will be composed of a series of intersecting channels leading to a reservoir located at one side of the broiler, and provided with a series of blunt-pointed posts for supporting the meat above the perforations, for producing a temporarily-formed horizontal flue between the web and the meat and leading the juices down to the intersecting channels of the web, and providing means by which the hot products of the fire will be made to circulate between the meat and the perforated web and have exit therefrom at points outside the circumferential sides of the cover, whereby the meat will be uniformly broiled in all its portions and the juices thereof will be led to the reservoir as fast as they are made to exude therefrom. I attain these objects by means of the mechanism illustrated in the accompanying drawings, in which there are four figures illustrating my invention, in all of which the same designation of parts by letters of reference are used.

Figure 1 is a sectional elevation through the broiler, taken at line No. 1 in Fig. 2, and with a side elevation of the broiler-cover. Fig. 2 is a plan view of the broiler. Fig. 3 is a side elevation taken at line No. 2 in Fig. 2. Fig. 4 is a plan view illustrating two modifications of forms of openings.

In the drawings, A represents the body of the broiler, which is preferably made with a squared form, with its corners rounded or curved, though it may be made circular or other form, and is provided with a handle for convenience for lifting the same.

The bottom or floor of the broiler is a perforated web, in which the perforations $b\ b$ are made circular in web $d$, and with a diameter of about one-half of one inch, more or less. These perforations are made in rows, and are arranged in a regular manner at about equal distances apart in said web, as shown in Fig. 2. The marginal edge of each of said circular perforations is bounded on the upper side with an upwardly-projecting circular ledge, $e$. These ledges stiffen perforated web $d$, and at the same time prevent the juices from the meat from running off from the upper surfaces of web $d$ into the fire below while the meat is being broiled. This web $d$, made with the rows of circular perforations $b\ b$, is old and not my invention.

Made in solid connection with web $d$, and alternating with circular perforations $b\ b$, are vertical projections $c\ c$, which extend upward from said web, as shown in Figs. 2 and 3. The upper ends of these projections are made with blunt points, so as to present only small supporting-surfaces to the meat M, and at the same time be incapable of penetrating into the same, as do the sharp needle-like points employed with the old bar form of broiler heretofore used.

Located at one side of the body of the broiler, and preferably at the handle side of the same, is a reservoir, $f$, for receiving the juices which may exude from the meat supported on projections $c\ c$ and be received on the perforated web below. At either end of this reservoir is made a spout, $g$, through which the juices and gravy may be poured out from the same.

Extending downward from the marginal edges of perforated web $d$ of the broiler is skirt $h$. This skirt extends around three sides of the broiler, with the two lateral side portions thereof connecting rearward with its rear side portions and forward with the wall of reservoir $f$. The plane of the lower edges, $i$, of this skirt is made to be in such a relation to the plane of the upper surface of perforated web $d$ that the latter will be made to incline downward and forward toward reservoir $f$, so as to cause the juices and gravy running from the meat to the perforated web of the broiler to flow through the several intersecting channels formed by perforated web d and circular ledges c to reservoir f, to be poured from the same at any time preferred by the operator. This skirt h (being thus formed with its lower marginal edges, i, and the lower side of the wall of reservoir f on the same horizontal plane) will be made to have its support on the portion of the top plate, P, of the stove surrounding the pot-hole H, over which the broiler is placed when being operated, and will prevent the hot gases from the fire from escaping at points below the perforated web of the broiler.

Projecting from the upper side of perforated web d, around its three sides, and also from the outer side of reservoir f, is the inclosing-wall W. Made in portions of this wall are seats s s, located at short distances below the upper marginal edges of the same, and on the same horizontal plane. Other portions of this wall are in offsetting situation at several points, as at w' w', by being made to extend outward from the line of seats s s, as shown in Fig. 2. A cover, C, is also provided. This cover is made, in its circumferential form, to correspond with lines of seats s s, so that the lower edge of rim C' of cover C will be readily received on said seats, and close with the portions of the wall at said seats, while there will be produced between the offsetting portions w' w' of wall W and the portions of rim C' of the cover uncovered openings, q q, which will operate as exit-flues for producing a temporary upward draft from the stove through the pot-hole and perforated web of the broiler and beneath the broiling meat supported by projections c c.

In operation the broiler is placed over the uncovered pot-hole H, with the lower edge of skirt h and lower side of wall of reservoir f resting on the portions of stove-top P surrounding said pot-hole, when the planes of perforated web d and the series of blunt-pointed projections c will be slightly inclined, with the bottom of reservoir f on a plane below the upper side of the channeled and perforated web d. The meat is then placed on projections c c, which projections will support the meat at a uniform and short distance above the circular perforations b b without being penetrated in the least. Cover C will then be placed in position, with its rim C' resting on seats s in wall W, and thereby prevent the outer air from acting on the meat to cool the same, while the exit or draft flues q q, formed between the rim of the cover and offsetting portions w' w' of the wall W will be produced outside the circumferential line of the cover. The operator will then check the draft of the stove by closing or partly closing the damper in the stove-pipe, and thereby reverse, in part or in whole, the draft of the stove, and by so doing cause the draft to be temporarily upward from the pot-hole and through circular perforations b in the web d, and thence horizontally and radially between the said web and the lower side of meat M to the offsetting exit-flues q q, from thence to escape in the directions shown or indicated by arrows in Fig. 1. In the operation of broiling, the juices of the meat will flow down the sides of projections c, and thence over the inclined and intersecting channeled web d to reservoir f, without dropping through the perforations into the fire.

Fig. 4 illustrates how either of the two modifications of form and arrangement of perforations in which guttered bars having each a series of projections, c c, can be employed with a reservoir, f, with skirt h relatively at an angle with the plane of the floor of the broiler, and with an upwardly-extended side wall, W, provided with cover-seats s and offsetting wall portions w' w'. These oblong perforations, (shown in Fig. 4,) although operating the same as do the oblong perforations in the old bar form of broiler, operate to weaken the floor of the broiler, and also to cook the meat unevenly, as those oblong openings will permit the fire to operate more fiercely and rapidly on those portions of the meat directly over said openings, while the bars intervening between the meat and the fire will shield the portion of the meat above them from such rapid and fierce action of the fire, so that the meat will be unevenly broiled. On the other hand, the employment of the meat-supporting posts or projections c, with circular perforations b, operate to cause the hot gases to rapidly pass up from the fire in a uniformly-diffusive manner into the flue formed temporarily between the meat and the perforated web, without scorching or burning the meat opposite those openings, and more in contact with the meat, to act on the same in the most effective and uniform manner throughout the whole extent of its surface in their passage to the exit-flues q q.

In the use of my improved broiler with an oil-stove, in which the draft of the hot products is naturally upward, the advantage of a uniformly-diffusive passage of the hot products through the circular perforations will at once be apparent over the more direct and uneven passage and ready escape of those products of the fire when a bar form of broiler with oblong perforations is employed.

I am aware that broilers made with alternate oblong slots or perforations and channeled bars provided with point projections are old. I do not claim the same as being my invention. Also, that broilers made with a web having circular perforations are old; but such perforated webs have no meat-supporting projections, and are made convex in their upper surface, and not with a flat inclined upper surface, as in my improved broiler. I do not therefore claim, broadly, a broiler having a perforated web in which the perforations are circular, as such perforated webs in a broiler will operate to elevate the middle portion of the meat to a greater distance above the fire than are the outer portions of the same, while at the same time the meat will close the perforations and prevent the hot products of the fire from acting effectively on all portions of the meat.

I am also aware that broilers having an inclined series of channeled bars alternating with oblong slots and having a depending skirt are old. I do not therefore broadly claim a broiler with a depending skirt and a perforated floor or web which is inclined.

What I do claim, and desire to secure by Letters Patent, is—

1. A broiler which has a flat web or bottom, $d$, which is slightly inclined and provided with a series of circular perforations, $b$, arranged uniformly in rows, and having a series of blunt-pointed meat-supporting projections or posts, $c\ c$, alternating with said flanged circular perforations, and also a depending skirt supporting the perforated web from the top plate of the stove, substantially as and for the purpose set forth.

2. A broiler which has an inclined flat web or bottom, $d$, provided with several rows of ring-flanged circular perforations, $b$, and meat-supporting posts or projections $c$, alternating between said circular perforations, and having reservoir $f$, located at the side toward which the perforated web inclines, and a depending skirt having its lower marginal edge on a horizontal plane with the lower side of the wall of said reservoir, all for united operation, for closing the broiler with the stove-top and causing the juices to flow from the meat down the supporting-posts and over the intersecting channels of the perforated web, substantially as set forth.

3. A broiler which has an inclined flat web made with a series of intersecting channels, and provided with a series of circular perforations arranged in rows between said intersecting channels, and also with a series of meat-supporting posts or projections, $c$, also arranged in rows in said intersecting channels and alternate with said circular perforations, and with a reservoir located at the side the web inclines to, substantially as and for the purposes set forth.

4. A broiler which has a perforated web or bottom, a series of upwardly-projecting supporting-points situated between the perforations of the web, and an upwardly-projecting wall around the perforated web, which has cover-supporting seats placed at intervals and adapted to support a cover from points above the perforated web, and lateral extensions of portions thereof outward past the line of said seats, so as to produce exit-openings between the wall and the cover when the latter is in position, substantially as set forth.

5. The combination, with a broiler which has a perforated web or bottom, through which the hot gases may pass from the fire, projected points situated at intervals between the openings in the web or bottom and adapted to hold the meat off from closing the perforations in the web, an outer wall which will have portions thereof, at intervals, projecting outwardly or laterally past the lines of the cover-seat, of a cover which will be supported from the broiler at two or more points, all for operations as set forth.

WILLIAM HAILES.

Witnesses:
JOHN LA DOW,
CHARLES SELKIRK.